US012614358B2

(12) United States Patent     (10) Patent No.:  US 12,614,358 B2

Bailey et al.                    (45) Date of Patent:      Apr. 28, 2026

(54) AUGMENTED REALITY ENVIRONMENT MELDING

(71) Applicant: International Business Machines Corporation, Armonk, NY (US)

(72) Inventors: Logan Bailey, Atlanta, GA (US); Zachary A. Silverstein, Georgetown, TX (US); Martin G. Keen, Cary, NC (US); Tyler Hansen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/188,600

(22) Filed: Mar. 23, 2023

(65)              Prior Publication Data

US 2024/0320928 A1      Sep. 26, 2024

(51) Int. Cl.
  *G06T 19/00*         (2011.01)
  *G06T 19/20*         (2011.01)
(52) U.S. Cl.
  CPC ............ *G06T 19/006* (2013.01); *G06T 19/20* (2013.01)
(58) Field of Classification Search
  None
  See application file for complete search history.

(56)              References Cited

U.S. PATENT DOCUMENTS

| 11,095,869 | B2 | 8/2021 | Holzer | |
| 11,621,979 | B1* | 4/2023 | Slotznick | H04L 65/403 |
| | | | | 348/14.07 |

| 2011/0113018 | A1 | 5/2011 | Hamilton, II | |
| 2015/0287241 | A1 | 10/2015 | Huston | |
| 2016/0195403 | A1* | 7/2016 | Tuukkanen | G01C 21/3423 |
| | | | | 701/533 |
| 2017/0365102 | A1 | 12/2017 | Huston | |
| 2019/0073712 | A1* | 3/2019 | Nickerson | G06F 3/167 |
| 2019/0373080 | A1* | 12/2019 | Bastide | H04L 67/1014 |
| 2019/0378335 | A1* | 12/2019 | Bentovim | G09G 3/002 |
| 2020/0134827 | A1* | 4/2020 | Saha | G06V 20/13 |
| 2020/0167120 | A1 | 5/2020 | Rakshit | |
| 2020/0210137 | A1* | 7/2020 | Noris | G06F 3/0346 |
| 2020/0402315 | A1* | 12/2020 | Yerli | G06T 17/005 |

(Continued)

FOREIGN PATENT DOCUMENTS

CN          101452339 B      4/2013

OTHER PUBLICATIONS

Anonymous, "Splicing different speakers seamlessly in the shared screen during video conference." IP.com No. IPCOM000241384D, IP.com Electronic Publication Date: Apr. 22, 2015, 5 pages.

(Continued)

*Primary Examiner* — Anh-Tuan V Nguyen

(74) *Attorney, Agent, or Firm* — Andre Adkins

(57)              ABSTRACT

Techniques are described with respect to a system, method, and computer program product for merging augmented reality experiences into an augmented reality environment. An associated method includes determining a first augmented reality experience of a first user and a second augmented reality experience of a second user; analyzing a plurality of environmental contextual data associated with the first augmented reality experience and the second augmented reality experience; and based on the analysis, generating a merged augmented reality environment comprising the first user and the second user.

20 Claims, 6 Drawing Sheets

(56) References Cited

U.S. PATENT DOCUMENTS

| | | | | |
|---|---|---|---|---|
| 2020/0413006 | A1* | 12/2020 | Cheng | G11B 27/031 |
| 2021/0011607 | A1* | 1/2021 | Ziman | G06T 19/003 |
| 2021/0383115 | A1* | 12/2021 | Alon | B25J 9/1602 |
| 2022/0101420 | A1* | 3/2022 | Woodyard | G06Q 30/0631 |
| 2022/0139055 | A1* | 5/2022 | Palmaro | G06T 19/006 |
| | | | | 345/419 |
| 2022/0383594 | A1 | 12/2022 | Li | |
| 2023/0206571 | A1* | 6/2023 | Darling | H04L 67/1095 |
| | | | | 345/633 |
| 2023/0305894 | A1* | 9/2023 | Fan | G06N 20/00 |
| 2023/0419625 | A1* | 12/2023 | Chiu | G06V 10/255 |
| 2024/0056553 | A1* | 2/2024 | Brudy | G06Q 10/101 |
| 2024/0104863 | A1* | 3/2024 | Brewer | G06T 7/11 |

OTHER PUBLICATIONS

Eisert, Peter, "Immersive 3-D Video Conferencing: Challenges, Concepts, and Implementations", Proceedings of the Visual Communications and Image Processing (VCIP), Lugano, Switzerland, Jul. 8, 2003, 11 pages.

* cited by examiner

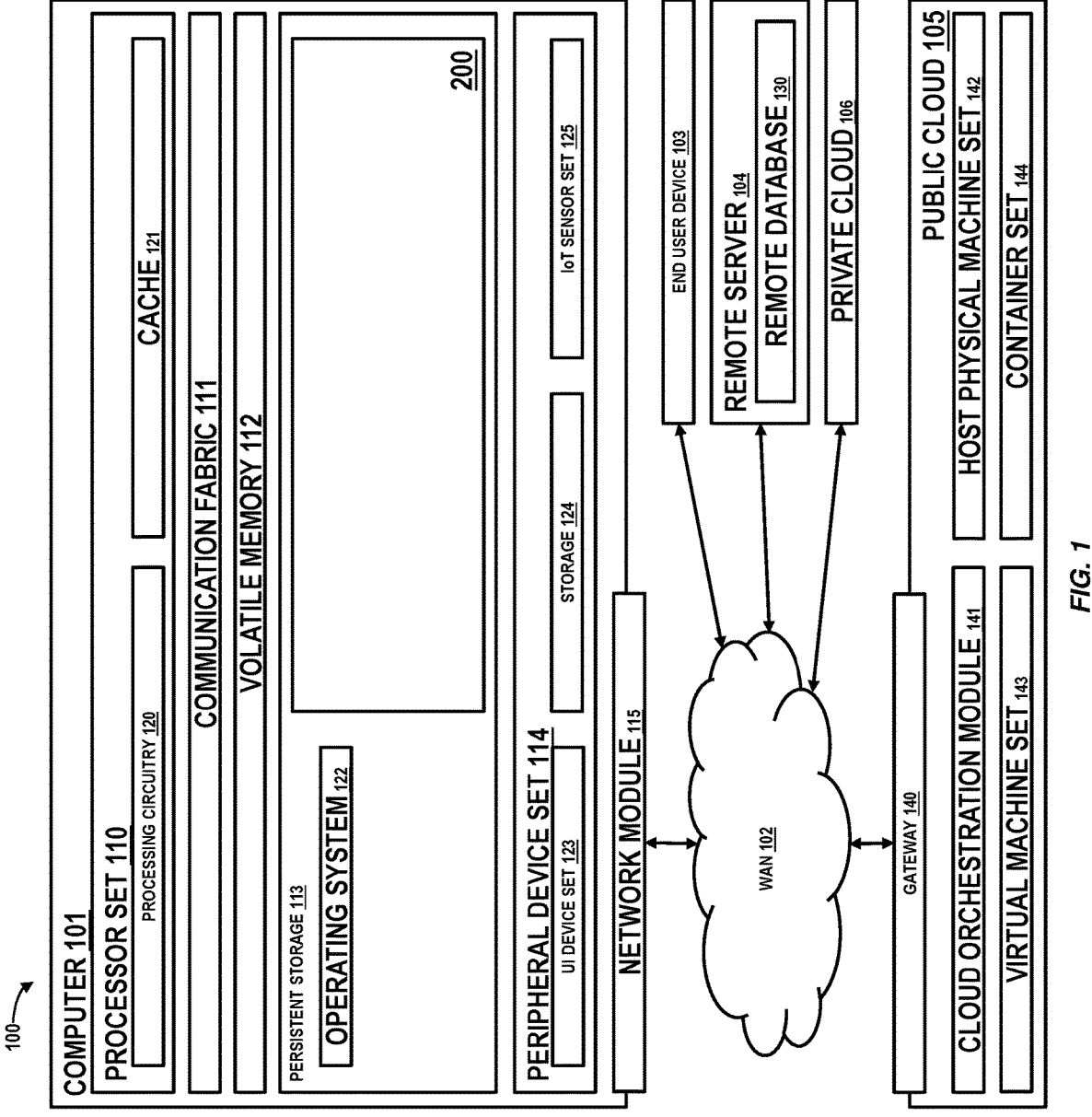

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

AUGMENTED REALITY ENVIRONMENT MELDING

BACKGROUND

This disclosure relates generally to computing systems and augmented reality, and more particularly to computing systems, computer-implemented methods, and computer program products configured to support melding of augmented reality environments for collaborative user experiences and information sharing.

Virtual reality, augmented reality, extended reality, mixed reality, etc. has become used as a mechanism to facilitate collaborative interactive experiences for users via a real-world environment where objects which reside in the real world are modified by computer-generated perceptual information, sometimes across two or more sensory modalities, including visual, auditory, haptic, somatosensory and olfactory. Features such as, but not limited to, dynamic screen sharing, image sharing, video feed sharing, etc. facilitate collaborative environments smoothly interwoven with the physical world in such a way that it is frequently perceived as an immersive aspect of the real environment. In particular, experience sharing provides users across various geographic locations the ability to share various virtual occurrences in a manner in which two or more users are partaking in the same experience simultaneously in real-time. However, a drawback to these shared experiences is the rendering of virtual environments to the respective users which is generated based on various factors such as context, system configurations, etc.

SUMMARY

Additional aspects and/or advantages will be set forth in part in the description which follows and, in part, will be apparent from the description, or may be learned by practice of the invention.

Embodiments relate to a method, system, and computer program product for merging augmented reality experiences into an augmented reality environment. In some embodiments, the computer-implemented method for merging augmented reality experiences into an augmented reality environment comprises determining a first augmented reality experience of a first user and a second augmented reality experience of a second user; analyzing a plurality of environmental contextual data associated with the first augmented reality experience and the second augmented reality experience; and based on the analysis, generating a merged augmented reality environment comprising the first user and the second user.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 illustrates a networked computer environment, according to an exemplary embodiment;

DETAILED DESCRIPTION

Figure 2:
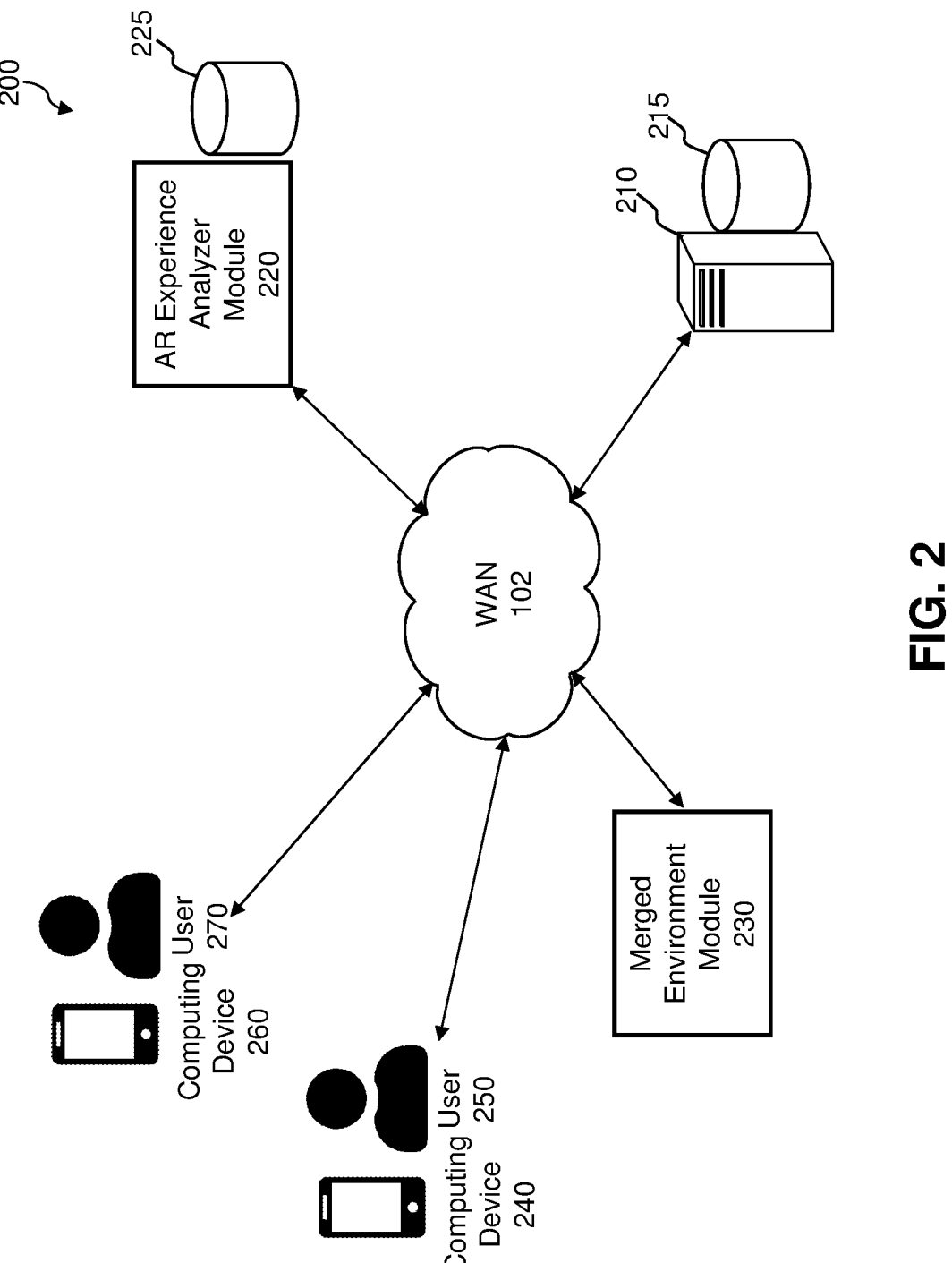
FIG. 2 illustrates a block diagram of an augmented reality experience merging environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for merging augmented reality experiences into an augmented reality environment. Virtual reality, augmented reality, extended reality, mixed reality systems, etc. have become mechanisms for users to engage in shared experiences, which allows for embedded three-dimensional augmented reality content to be displayed to multiple users spread out across various geographic locations in a seamless manner. However, efficient shared experiences generally require visually mapping which includes 3D point-cloud analyses of multi-media (e.g., images, videos, etc.) of the area in which the experience will be depicted to the respective users. Factors such as, but not limited to, system configurations, user geo-location, context of the shared experience, etc. can directly impact the shared experience. For example, a lack of contextual aspects and commonalities among the respective users' experiences can impact shared experience features such as bill sharing and thematic consistency (e.g., similar items listed on a virtual menu). Thus, the present embodiments have the capacity to improve augmented reality shared experiences by analyzing the respective augmented reality experiences of users, identifying commonalities among the augmented reality experiences, and generating a merged augmented reality environment including users of the shared experiences allowing facilitation of richer contextual experiences to users participating in a similar shared experience and/or commerce-based transaction (e.g., shopping, dining, etc.).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As described herein, augmented reality ("AR") is technology that enables enhancement of user perception of a real-world environment through superimposition of a digital overlay in a display interface providing a view of such environment. Augmented reality enables display of digital elements to highlight or otherwise annotate specific features of the physical world based upon data collection and analysis. For instance, augmented reality can provide respective visualizations of various layers of information relevant to displayed real-world scenes.

As described herein, virtual reality ("VR") refers to a computing environment configured to support computer-generated objects and computer mediated reality incorporating visual, auditory, and other forms of sensory feedback. It should be noted that a VR environment may be provided by any applicable computing device(s) configured to support a VR, augmented reality, extended reality, and/or mixed reality user interacting with their surroundings, said interactions including but not limited to user movement/gazing, manipulation of virtual and non-virtual objects, or any other applicable interactions between users and computing devices known to those of ordinary skill in the art.

As described herein, a "shared experience" is any applicable virtual interaction configured to allow multiple users to simultaneously share a real world surrounding them, a virtual world, and/or virtual objects/elements of virtual environments. Shared experiences may be remote, co-located, etc., in which users of shared experiences may exchange information and multi-media along with simultaneously interact with virtual objects/elements presented based on establish augmented reality environment contextual data. Examples of shared experiences include, but are not limited to, virtual meetings, shopping, dining, commerce-based transactions, or any other applicable persistent and shared augmented reality event known to those of ordinary skill in the art.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method and computer program product for merging augmented reality experiences into an augmented reality environment. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring now to FIG. 2, a functional block diagram of a networked computer environment illustrating a computing environment for an augmented reality experience merging environment system 200 (hereinafter "system") comprising a server 210 communicatively coupled to a database 215, an AR experience analyzer 220 communicatively coupled to an AR experience analyzer database 225, a merged environment module 230, a first computing device 240 associated with a first user 250, and a second computing device 260 associated with a second user 270, each of which are communicatively coupled over WAN 102 (hereinafter "network") and data from the components of system 200 transmitted across the network is stored in database 215.

In some embodiments, server 210 is configured to operate a centralized platform serving as a cloud-based AR environment merging mechanism configured to present a merged augmented reality environment comprising first user 250 and second user 270 generated by merged environment module 230 based on one or more analyses performed by AR experience analyzer 220. It should be noted that server 210 is configured to connect to various application programming interfaces (APIs) associated with commerce-based interaction platforms, order systems, point of sale (POS)/payment systems, food service management software, and the like in order to retrieve data from applicable web services that apply the representational state transfer (REST) architectural style, such as but not limited to HTTP methods (e.g., getLocation( ), getTableID( ), getMenu( ), getCheck( ), placeOrder( ), payCheck( ), etc.), JSON, XML, and the like. Furthermore, server 210 may be communicatively coupled to one or more web crawlers configured to crawl applicable web-based data sources in order to extract relevant data associated with virtual environments, virtual/interactive objects and elements associated with virtual environments, context specific data sources (e.g., social media platforms, weather data platforms, traffic data platforms, and the like), etc. For example, items listed on a menu for a restaurant in which users 250 and 270 are engaging a shared experience within virtually may be derived from the web crawlers extracting the menu data from an applicable web-based source associated with the restaurant.

Server 210 is configured to generate user profiles associated with users 250 and 270 designed to be stored on database 215. The user profiles are intended to serve as records of users not only representing consent received from users 250 and 270 for server 210 to access user current location and applicable sensors of computing devices 240 and 260 (e.g., camera, microphone, etc.), but also user preferences regarding virtual environment configurations, preferred shared experience locations (e.g., virtual conference room, virtual coffee shop, home, etc.), preferred contacts for shared experience, and the like. In some embodiments, the centralized platform is configured to provide user interfaces for presentation to computing devices 240 and 260, allowing users 250 and 270 to provide inputs that may be processed and stored in the user profiles.

AR experience analyzer 220 is designed to analyze AR experiences of users 250 and 270 along with their respective virtual environments. It should be noted that AR experience analyzer 220 may utilize cognitive/analytic systems, natural language processing ("NLP"), linear discriminant analysis ("LDA"), semantic analyzer, parsing functions, multi-media detection/analyses systems, computer visioning systems, and other applicable systems to not only perform analyses of the virtual environments, but also to ascertain environmental contextual data of the shared experiences and the virtual environments the shared experiences (hereinafter referred to as "contextual data") are held within. In some embodiments, AR experience analyzer 220 may ascertain contextual data based on how the information can be used in different virtual environments, shared experiences, multi-party discussions, etc., where users 250 and 270 are involved. AR experience analyzer 220 is further tasked with providing techniques that facilitate automatic, reliable performance of a point cloud object-environment segmentation task in order to analyze virtual environments. For example, AR experience analyzer 220 may provide the capability to perform automatic segmentation of a 3D point cloud into Object and virtual environment segments by progressively learning the object-environment segmentation from tracking sessions in augmented reality (AR) applications associated with the centralized platform. In AR applications, a 3D model of one or more objects that are to be displayed in a virtual environment in a multi-media stream may be generated and displayed on a scene or on virtual objects in the merged AR environment. In order to properly display such AR content, the position of computing devices 240 and 260 relative to the scene, and to objects in the merged AR environment on which AR content is to be presented, may be determined, and tracked as computing devices 240 and 260 move. A model of multi-dimensional virtual objects in the virtual environment may be generated using 3D reconstruction to multi-media data (e.g., images, video stream, etc.) in order to generate a 3D point cloud of the virtual object. The 3D point cloud may be used for tracking in AR application, by matching points from the cloud to regions in the live video.

Merged environment module 230 is tasked with the generation of a merged augmented reality environment comprising users 250 and 270 based on the segmentation and reconstruction performed by AR experience analyzer 220. In some embodiments, the merged AR environment is generated based on analyses of the respective virtual environments associated with the shared experience involving users 250 and 270 and/or the contextual data ascertained by AR experience analyzer 220. Merged environment module 230 is configured to utilize general adversarial networks (GANs), variational autoencoders, and/or any other applicable AR content mechanisms configured to render AR environments. Visualizations/AR content generated by merged environment module 230 are designed to be depicted to users 250 and 270 (preferably donning computing devices 240 and 260 respectively, computer-mediated reality devices) operating on the centralized platform. The navigation, viewing, and interactions of the merged AR environment and its virtual objects are simultaneously to users 250 and 270 in which each user's actions are agnostic to the others when the action does not pertain to context of the merged AR environment, such as view toggling, zoom in/out features, and/or any other VR/AR based features known to those of ordinary skill in the art. However, virtual content interactions of the merged AR environment are not agnostic due to the virtual objects of the merged AR environment being configured to facilitate crucial components of the shared experience. For example, in the instance in which the virtual object of the merged AR environment is a menu being viewed simultaneously by users 250 and 270, interactions of one user with the menu (e.g., placing an order, modifying an order, paying the bill, etc.) may be viewed by the other user in real-time.

In some embodiments, merged environment module 230 is designed to receive and process the analysis of virtual environments performed by AR experience analyzer 220, allowing merged environment module 230 to determine the virtual environment user 250 and/or user 270 is within based on various factors such as, but not limited to, context of augmented reality experience, specific location associated with common host of augmented reality experience, virtual object(s) within virtual environment of augmented reality experience(s) including unique identifiers configured to be detected by computing devices 240 and 260, location of computing devices 240 and 260, applicable Point of Sale (POS) system utilized by the respective augmented reality experiences associated with users 250 and 270, and the like. As described herein, a POS system is any applicable collection of hardware and/or software that enables users to initiate transactions, accept payments, check out, and the like.

Computing devices 240 and 260 may take the form of a desktop computer, laptop computer, tablet computer, smart phone, smart watch or other wearable computer, mainframe computer, computer-mediated reality (CMR) device/VR device (e.g., AR headset, AR goggles, and the like), quantum computer or any other form of computer or mobile device now known or to be developed in the future that is capable of running a program, accessing a network or querying a database.

Figure 3:
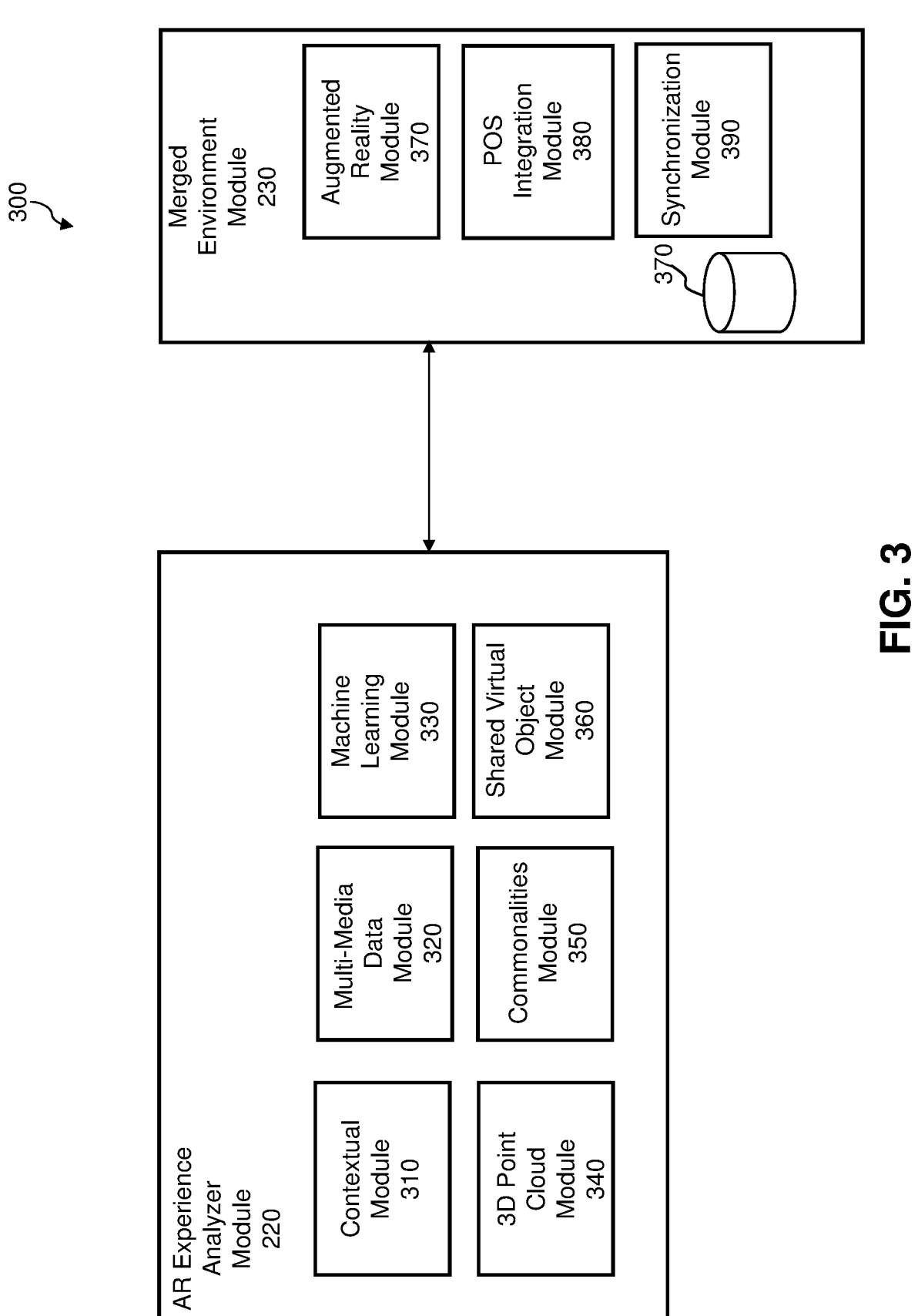
FIG. 3 illustrates a block diagram showing an augmented reality experience analyzer module and a merged environment module, according to an exemplary embodiment.

Referring now to FIG. 3, AR experience analyzer 220 and merged environment module 230 are depicted, accordingly to exemplary embodiment. In some embodiments, AR experience analyzer 220 comprises a contextual module 310, a multi-media data module 320, a machine learning module 330, a 3D point cloud module 340, a commonalities module 350, and a shared virtual object module 360. Merged environment module 230 comprises an augmented reality module 370, a POS integration module 380, and a synchronization module 390. It should be noted that AR experience analyzer 220, merged environment module 230, and their respective modules are configured to transmit information to each other over the network. For example, one or more outputs of machine learning models operated by machine learning module 330 may be utilized by augmented reality module 370 to generate the merged augmented reality environment for users 250 and 270.

Contextual module 310 is configured to ascertain the context of an AR experience being analyzed by AR experience analyzer 220. In some embodiments, contextual module 310 is configured to establish context based on interactions between users 250 and 270 and/or computing devices 240 and 260. For example, analysis of one or more dialogues exchanged between users 250 and 270 allows contextual module 310 to establish both the context of the respective AR experiences along with the desire of users 250 and 270 to engage in a shared experience. In some embodiments, contextual module 310 utilizes linear discriminant analysis ("LDA") and natural language processing ("NLP"), in order to perform topical extraction resulting in insight into personal connections and data exchange layers of meaning between users 250 and 270. Upon determining the context, contextual module 310 shares the information across computing devices 240 and 260 allowing merged environment module 230 to determine the virtual environment of users and generate the merged AR environment subject to not only the commonalities between the respective virtual environments, but also the multi-media data processed by multi-media data module 320. For example, dialogue between users 250 and 270 may indicate that they wish to attend a virtual screening of a movie together in which contextual module 310 establishes the context of a virtual movie theater and AR experience analyzer 220 determines the respective virtual environments as a setting for a movie to be screened; thus, merged environment module 230 begins the process of rendering a virtual environment representing a movie theater room configured to support positioning and viewing of the applicable screening for users 250 and 270 simultaneously in which users 250 and 270 may see representations of each other in a merged AR environment concurrently depicting the screening. In some embodiments, applicable data derived from the crawlers associated with the server 210 may support contextual module 310 in ascertaining context of the virtual environment based on one or more predictions generated by machine learning models operated by machine learning module 330. For example, users 250 and 270 may both favorite/like an advertisement for a new movie screening listed on a social media platform and/or users 250 and 270 may exchange direct messages, asynchronous messages, etc. regarding viewing the new movie, in which contextual module 310 establishes the context of the desired shared experience between users 250 and 270 to be a virtual screening of the new movie within the merges AR environment.

Multi-media data module 320 is configured to process a plurality of multi-media data derived from AR experiences. Multi-media data module 320 may utilize image recognition, object recognition, computing visioning techniques, etc. to facilitate the processing of multi-media data within the virtual environments associated with the AR experiences being analyzed. The multi-media data may include, but is not limited to, images, videos, audio, etc. within virtual environments associated with AR experiences. In some embodiments, processing of the multi-media data is accomplished by semantic segmentation of the virtual environment in order to identify virtual objects within the virtual environment, in which the identified virtual objects assist with identifying the type of AR experience associated with the virtual environment; however, segmenting of virtual objects and other applicable elements of virtual environments aims to optimize the ascertained context of a virtual environment. For example, while AR experience analyzer 220 is analyzing a virtual environment, multi-media data module 320 may detect one or more virtual objects representing cups of coffee/tea allowing contextual module 310 to ascertain that the virtual environment is a virtual coffee shop and that the AR experience is a coffee date. In particular, multi-media data module 320 utilizes semantic segmenting to define multi-media-based components within the virtual environment being analyzed by AR experience analyzer 220. Multi-media data module 320 may further apply annotations and descriptors to describe various physical and non-physical attributes of each segment such as, but not limited to, color, shape, texture, material, pose, positioning, and the like. In some embodiments, machine learning module 330 may evaluate one or more areas of each semantic segment in order to verify the annotations.

Machine learning module 330 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure. Furthermore, machine learning module 330 is configured to operate general adversarial networks (GANs), variational autoencoders, and/or any other applicable AR content mechanisms in order to assist merged environment module 230 with rendering AR environments.

3D point cloud module 340 is tasked with performing 3D reconstruction of virtual environments and their components. 3D point cloud module 340 utilizes segmenting in order to generate a 3D point cloud for a model of objects associated with the virtual environment, which ultimately assists with identification of the layout and configuration of the respective virtual environments associated with users 250 and 270. 3D point cloud module 340 providing the capability to progressively learn the virtual objects, background, scene, etc. is supported with the performance of cleaning and removing of unnecessary items that do not need to be included in the merged AR environment when it is ultimately generated. 3D point cloud module 340 may utilize binary segmenting, fuzzy segmenting, object detection/tracking, and/or any other applicable 3D point cloud reconstruction related technology known to those of ordinary skill in the art.

Commonalities module 350 is configured to identify a plurality of commonalities associated with users 250 and 270 and/or their AR experiences and respective virtual environments. In some embodiments, the commonalities are identified based upon contexts established by context module 310. Commonalities module 350 is designed to be supported by machine learning module 330 in which commonalities module 350 identifies the commonalities utilizing one or more clustering algorithms, in which data points derived from the AR experiences and virtual environments are grouped according to the clustering method. For example, commonalities module 350 may group the data points into k clusters or a hierarchy of clusters based on similarity resulting in commonalities module 350 identifying the commonalities based upon the respective contexts ascertained by context module 310. The commonalities are utilized by merged environment module 230 in order to generate the merged AR environment in which the merged AR environment is a joint virtual environment for users 250 and 270 configured to support interactions between users 250 and 270 along with the merged AR environment in order to provide users 250 and 270 with a synchronized shared AR experience. For example, users 250 and 270 may be operating in their respective virtual environments provided to computing devices 240 and 260, in which context module 310 establishes that users 250 and 270 desire to engage in a shared virtual dining experience based upon interactions with a virtual object within the virtual environments configured to establish respective contexts (i.e., a digital dining menu). In another example, context module 310 establishes that users 250 and 270 wish to engage in a shared virtual conference experience based upon computing devices 240 and 260 detecting the respective locations of users 250 and

270 within virtual coffeeshops and/or meeting rooms associated with their respective virtual environments. Upon establishing the respective contexts, commonalities module 350 identifies commonalities across the respective virtual environments of users 250 and 270 including, but not limited to, barista stands, conference tables, coffee/tea cups, virtual aromas of coffee beans, etc., allowing merged environment module 230 to generate a merged AR environment based on the identified commonalities between the two contexts.

Shared virtual object module 360 is tasked with generating shared virtual objects for the merged AR environment in which the shared virtual objects are designed to be synchronized and inserted into the merged AR environment, and configured to be interacted with simultaneously by users 250 and 270. In some embodiments, shared virtual object module 360 is supported by machine learning module 330 in which machine learning module 330 utilizes reinforcement learning and/or supervised learning to guide users 250 and 270 in their interactions with each other and the shared virtual objects within the merged AR environment. For example, in a shared virtual dining experience, shared virtual object module 360 may generate a digital menu to be inserted into the merged AR environment allowing users 250 and 270 to simultaneously interact with the digital menu and place orders including items listed on the digital menu, in which the items may be compiled on a digital tab accessible by users 250 and 270. In some embodiments, shared virtual objects are based on the contextual data and may be triggered by interactive gestures performed by users 250 and 270 in which the shared AR experience is initiated by one or more interactive gestures (e.g., an utterance, swiping motion, head nod, etc).

Augmented reality module 370 is tasked with generating the merged AR environment (e.g., an augmented reality model of the scene/environment or superimposing virtual content over a real world view of the scene in augmented reality simultaneously for users 250 and 270) to navigate/interact with based on the contextual data in addition to the one or more analyses performed by AR experience analyzer 220. Augmented reality module 370 may utilize various mechanisms and techniques known to those of ordinary skill in the art to render and present virtual content including but not limited to, AR environments, virtual objects, and the like. In particular, augmented reality module 370 overlays virtual content generated based on the contextual data for vision augmentation of the counterparty allowing mirroring of subsets of AR interactions of users 250 and 270 with their respective AR environments and virtual objects. For example, augmented reality module 370 determines and generates the layout, configurations, virtual objects, etc. of the merged AR environment based on the contextual data, in which augmented reality module 370, with the assistance of machine learning module 330, utilizes GANs and variational autoencoders based on the commonalities between the two contexts to generate the merged AR environment and its components.

POS integration module 380 is configured to integrate the applicable POS system into the merged AR environment based on the contextual data and identified commonalities. It should be noted that POS integration module 380 is configured to initiate a financial transaction within the merged AR environment allowing users 250 and 270 to initiate payments and/or transmit payment requests for applicable goods and services associated with the merged AR environment, and POS integration module 380 interfaces with payment cards to make electronic funds transfers. Furthermore, POS integration module 380 supports smart transactions designed to allow computing devices 240 and 260 (e.g., cameras thereof or applicable scanning modules) to initiate payment for goods and services of the merged AR environment in a manner that facilitates multiple user remote transactions, in which the smart transactions may include smart transaction data such as, but not limited to, transaction amount, merchant info, purchaser info, payment mechanism data, goods and service info (e.g., type, location, etc.), and the like all of which may be stored in a POS data 275 for facilitating future financial transactions and user payment preferences. Digital currencies may be utilized to facilitate the smart transactions in which the digital currencies may include but are not limited to financial transaction cards, cryptocurrencies, or any other applicable means of currency known to those of ordinary skill in the art. In some embodiments, POS integration module 380 is configured to initiate a POS system based on one of more of users 250 and 270 having interactions with an applicable POS sensor associated with the POS sensor (e.g., POS sensor being within the field of view at a predetermined distance and/or for a predetermined amount of time). POS integration module 380 transmits transaction information to the applicable merchant associated with the offered goods or services of the merged AR environment; however, in the instance in which the respective AR environments of the AR experiences of users 250 and 270 are associated with different merchants, POS integration module 380 may consolidate the financial transactions by hosting separate smart transactions with each respective merchant. For example, a first AR experience of user 250 may be associated with a first merchant and a second AR experience of user 270 may be associated with second merchant; however, POS integration module 380 allows user 250 to pay the digital tab associated with the second merchant within the merged AR environment on behalf of user 270.

POS integration module 380 may further support interpreting payment gestures performed by users 250 and 270 which initiates the process of paying the digital tab. For example, an utterance of "check please", a writing motion in the air, user inputs into a virtual keyboard, or any other applicable AR interactive gesture initiates the process that allows users 250 and 270 to pay for a portion or all of the digital tab. It should be noted that a purpose of POS integration module 380 is to facilitate remote processing of financial transactions within the merged AR environment in which users may pay for each other's digital tab wirelessly subject to approval by POS integration module 380, and POS integration module 380 may present instruction to users 250 and 270 within the merged AR environment as to how to complete a financial transaction associated with the digital tab and/or the shared AR experience. For security purposes, POS integration module 380 may further require authentication within the merged AR environment from one or more users 250 and 270 to initiate a financial transaction in which authentication may be accomplished via biometric scan authorization performed by computing devices 240 and 260, a one-time-use code, or any other applicable form of user authorization known to those of ordinary skill in the art.

Synchronization module 390 is tasked with synchronizing the views, AR content, notifications, layouts, etc. of the respective AR environments within the merged AR environment. It should be noted that in addition to contextual data and analyses performed by AR experience analyzer 220, synchronization module 390 may take into consideration various factors such as, but not limited to, environment location, geo-fencing area, time, etc. when performing mapping and synchronization of the respective AR environments associated with users 250 and 270 when creating the merged AR environment. Synchronization module 390 may take various parameters (e.g., user location, user behavior, and/or timing information) into consideration when performing synchronization of the AR environments, in which the parameters may be continuously considered and updated in order for augmented reality module 370 to update the merged AR environment and its components in real-time. For example, the digital menu of the respective AR environments may have differentiating items listed for each of users 250 and 270 (due to different experience providers), in which synchronization module 390 may generate the digital menu as a synchronization of the respective digital menus including an aggregation of the items of both digital menus.

Figure 4:
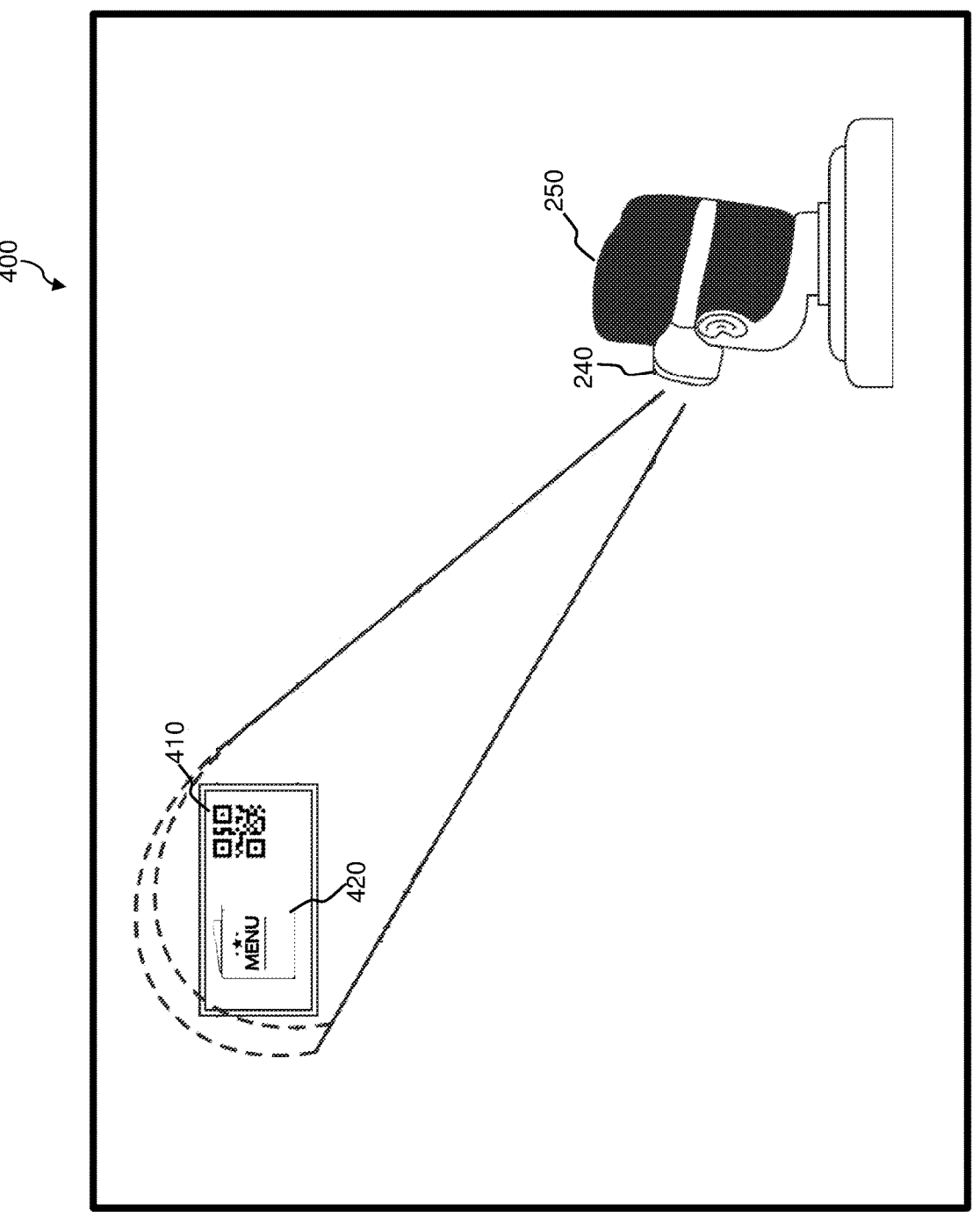
FIG. 4 illustrates a schematic diagram showing an augmented reality experience of a first user applied to a virtual environment, as viewed through a computer-mediated reality device, according to an exemplary embodiment.

Referring now to FIG. 4, an augmented reality experience 400 of user 250 is depicted, according to an exemplary embodiment. Augmented reality module 370 generates and presents a virtual environment associated with experience 400 to user 250 via computing device 240, in which AR experience analyzer 220 analyzes the virtual environment in order to ascertain its context along with other multi-media data associated with the virtual environment. In some embodiments, the virtual environment comprises a unique identifier 410 which may be a QR code, RFID, or any other applicable type of uniquely identifying mechanism known to those of ordinary skill in the art. Unique identifier 410 may be integrated into the virtual environment based upon the detected context ascertained from the analysis of the virtual environment. For example upon AR experience analyzer 220 detecting that the virtual environment is a virtual restaurant, augmented reality module 370 may integrate unique identifier 410 as a notification or a table within the virtual restaurant, in which user 250 being within a predetermined distance and/or gazing at unique identifier 410 for a predetermined amount of time triggers presentation of a virtual object 420. In some embodiments, the interaction with unique identifier 410 and/or other applicable event based on the analysis of the virtual environment and the contextual data indicates that user 250 wishes to engage in a shared AR experience at the virtual restaurant in which virtual object 420 is presented to user 250 in order for user 250 to initiate a series of application programming interface (API) calls configured to be manifested in the merged AR environment once it is generated by augmented reality module 370, in which the API calls represent various interactions with virtual object 420, such as but not limited to getLocation( ), getTableID( ), getMenu( ), getCheck( ), placeOrder( ), payCheck( ), etc.

Figure 5:
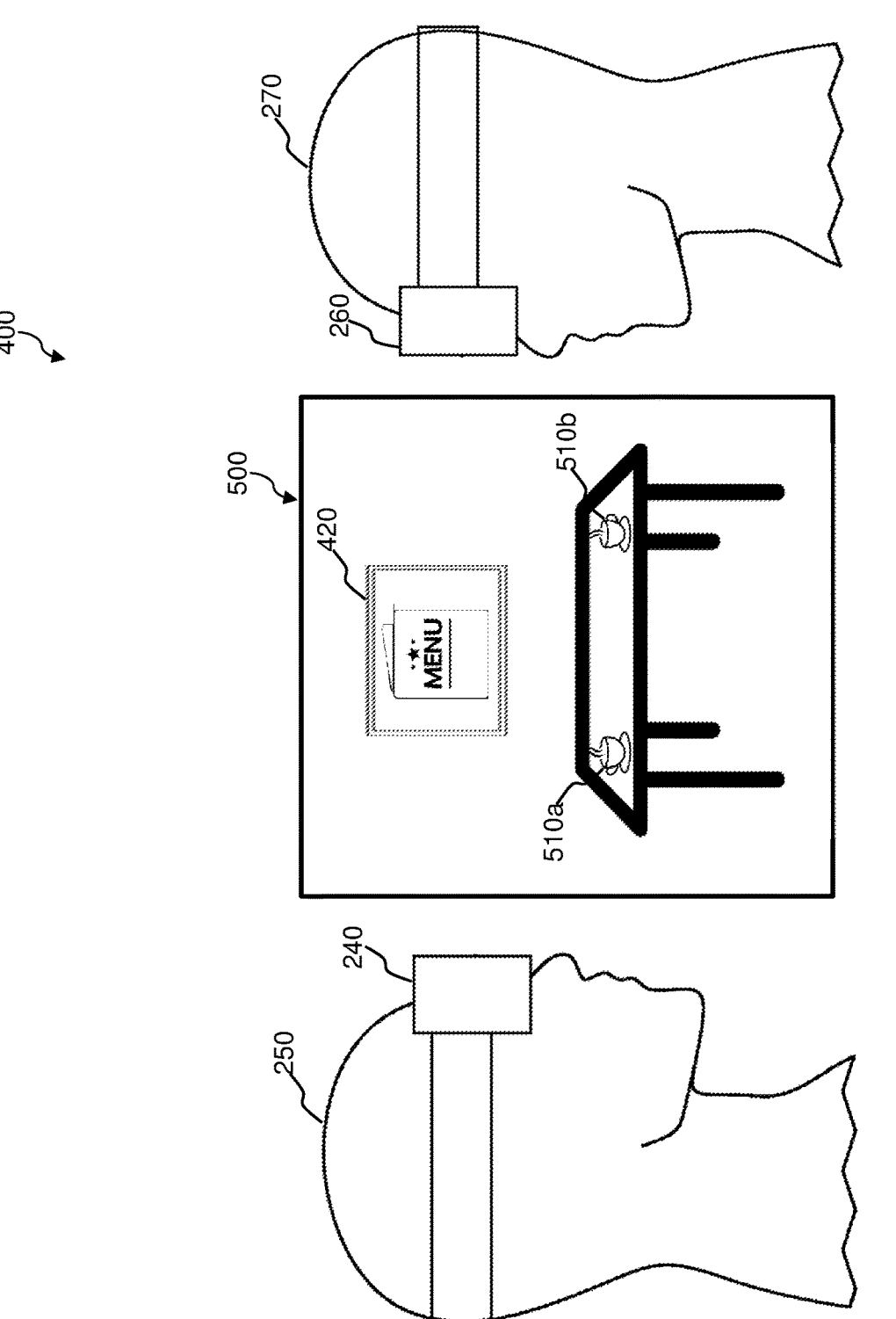
FIG. 5 illustrates a schematic diagram showing a shared augmented reality experience depicted to the first user and a second user as a result of melding respective augmented reality experiences in a merged augmented reality environment, according to an exemplary embodiment.

Referring now to FIG. 5, a shared augmented reality experience 500 is depicted comprising users 250 and 270, according to an exemplary embodiment. It should be noted that augmented reality module 370 generates and presents experience 500 to computing device 240 and 260, in which experience 500 is a result of melding respective AR experiences of users 250 and 270 based on at least the contextual data. Layouts, virtual objects, orientations/positions, viewpoints, etc. of users 250 and 270 are configured to be updated in real-time allowing the merged AR environment to continuously account for modifications. Reinforcement learning and/or supervised learning is utilized in order to guide users 250 and 270 in their interactions with each other within experience 500. Users 250 and 270 order shared virtual elements 510*a* and 510*b* off of virtual object 420. In one embodiment, shared virtual elements 510*a* and 510*b* are virtual beverages configured to be viewed by both users 250 and 270 from their perspective angles subject to their orientation/positioning, layout preferences, etc. In some embodiments, augmented reality module 370 utilizes one or more generative adversarial networks ("GANs") employed to evaluate distributions of model input parameters that are coherent with a given distribution of results associated with the analyses performed by AR experience analyzer 220. Augmented reality module 370 may communicate with machine learning module 330 to operate one or more of a variational autoencoder (VAE), a Wasserstein autoencoder (WAE), an adversarial autoencoder (AAE), etc. Training of models under the direction of augmented reality module 370 may include training the encoder and the decoder or the encoder and decoder may be trained with just the labeled and unlabeled data, without using associated labels for the labeled data. However, mapping between the physical environment surrounding of users 250 and 270 and the merged AR environment is based on at least the contextual data.

Figure 6:
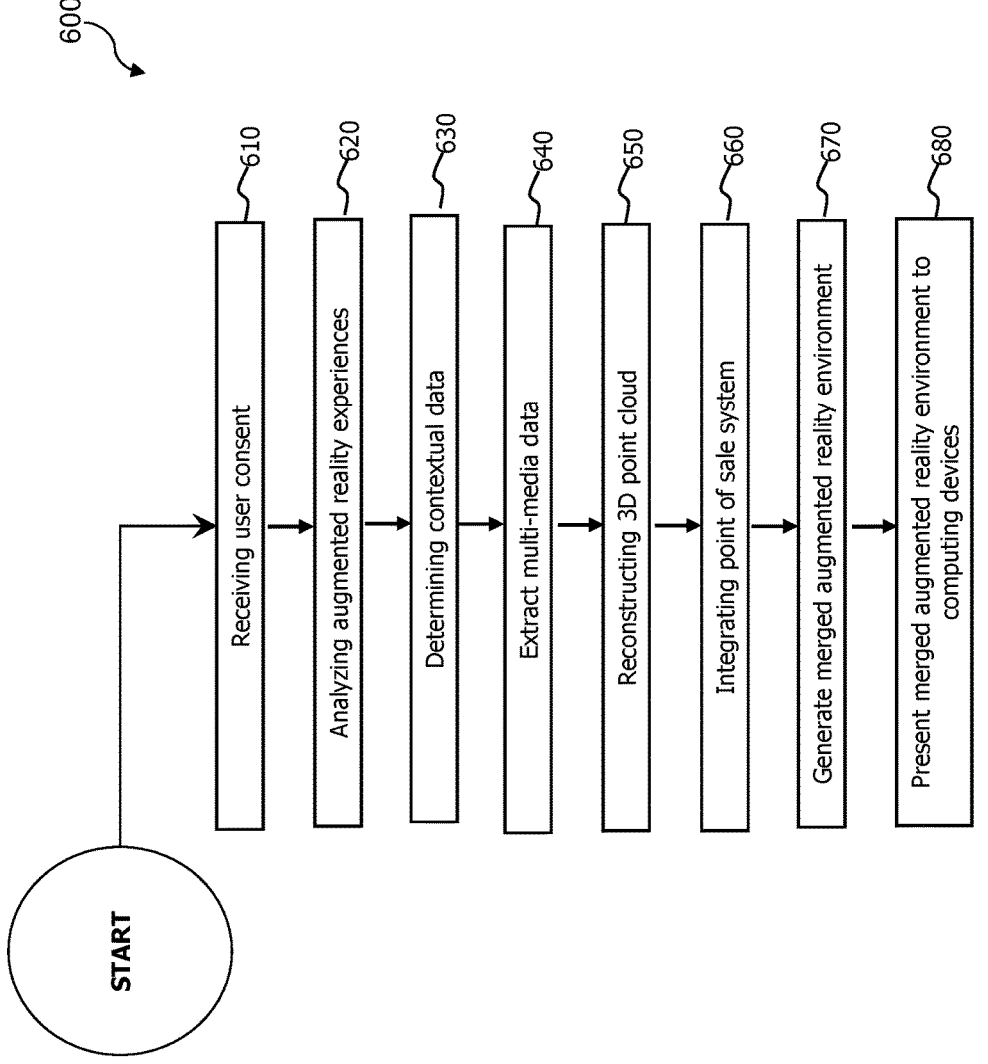
FIG. 6 illustrates a flowchart depicting a method for merging augmented reality experiences into an augmented reality environment, according to an exemplary embodiment.

With the foregoing overview of the example architecture, it may be helpful now to consider a high-level discussion of an example process. FIG. 6 depicts a flowchart illustrating a computer-implemented process 600 for a method for merging augmented reality experiences into an augmented reality environment, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which operations are described is not intended to be construed as a limitation, and any number of the described blocks can be combined in any order and/or performed in parallel to implement the process.

At step 610 of process 600, consent of users 250 and 270 is received by server 210. It should be noted that users 250 and 270 may provide consent on their respective computing devices via one or more user interfaces provided on the centralized platform; however, user consent may be acquired by user gestures (e.g., head nod, body movements, etc.) detected by computing devices 240 and 260, interactions with virtual objects within the virtual environment, or any other applicable mechanism to receive user approval known to those of ordinary skill in the art.

At step 620 of process 600, AR experience analyzer 220 analyzes the respective augmented reality experiences of users 250 and 270 operating on computing devices 240 and 260. It should be noted that initiation of melding/integrating of the augmented reality experiences of users 250 and 270 may be based on various factors such as, proximity of respective geographic locations derived from computing devices 240 and 260, presence of users 250 and 270 within a similar and/or relevant virtual venue (e.g., virtual stadium, restaurant, marketplace, etc.), contextual data ascertained by contextual module 310, and the like.

At step 630 of process 600, contextual module 310 determines contextual data based on the analyses performed on the respective AR experiences by AR experience analyzer 220. Contextual module 310 determines the contextual data via utilizing a plurality of various mechanisms such as, but not limited to cognitive/analytic systems, NLP/linguistics analysis (e.g., word2vec, doc2vec, etc.), LDA, semantic analyzer, parsing functions, multi-media detection/analyses systems, computer visioning systems, applicable machine learning models operated by machine learning module 330, etc. In some embodiments, the ascertained contextual data guides configuration/design of the merged AR environment. For example, contextual data may assist with building the design of user interfaces associated with the AR experience, setting virtual environments, providing a subset of virtual interaction options based on the virtual elements present to users 250 and 270, and the like. In some embodiments, the contextual data supports virtual environment themes in which the identified commonalities are merged into the merged virtual environment in an aggregated manner. For example, in the instance in which users 250 and 270 are in two distinct virtual coffee shops operated by two different providers, the virtual menu provided to users 250 and 270 in the merged environment lists items from both of the menus of the respective virtual coffee shops.

At step 640 of process 600, multi-media data module 320 extracts multi-media data from the respective AR experiences of users 250 and 270. It is one of the goals of multi-media data module 320 to capture the immediate environmental context for vision augmentation, in which the respective AR experiences may have commonalities that may be used as a resource in the generation of the merged AR experience. Videos, images, audio, virtual objects, etc. of a virtual environment may be reincarnated in the merged AR experience in an attempt to provide users 250 and 270 the optimum AR experience. For example, user preference data associated with users 250 and 270 may indicate that users 250 and 270 share an interest in a particular musician, in which multi-media data module 320 may utilize this information to assure that merged environment module 230 integrates music of the particular musician in the merged AR environment.

At step 650 of process 600, 3D point cloud module 340 reconstructs the 3D point cloud of the virtual environment. 3D point cloud module 340 may utilize binary segmentation, fuzzy segmentation, or other applicable 3D point cloud reconstruction mechanism known to those of ordinary skill in the art. 3D point cloud module 340 performing reconstruction of the virtual environments allows identification of the type of environment, the layout/design of the scene, and also the removing/cleaning of unnecessary objects that will be filtered out when the merged AR environment is generated.

At step 660 of process 600, POS integration module 380 integrates the applicable POS system. As previously mentioned, the selection and integration of a POS system may be based upon the contextual data and other various applicable factors. For example, the contextual information may indicate that users 250 and 270 are both in distinct virtual coffee shops requiring two separate POS system subject to the applicable providers associated with the virtual coffee shops. POS integration module 380 facilitates the POS system that is qualified to allow users 250 and 270 various features such as bill-splitting, gifting, etc.

At step 670 of process 600, augmented reality module 370 generates the merged AR environment. The merged AR environment may be derived from synchronization module 390 synchronizing the views, AR content (i.e., virtual objects), notifications, layouts, etc. of the respective AR environments within the merged AR environment in order to facilitate a mechanism for interpersonal collaboration and effective communication via the merged AR environment. In some embodiments, the merged AR environment may facilitate various shared AR experiences such as virtual meetings, virtual sporting events, virtual dining/shopping, and any other applicable shared virtual experiences known to those of ordinary skill in the art.

At step 680 of process 600, augmented reality module 370 presents the merged AR environment to computing devices 240 and 260. It should be noted that the merged environment is a shared AR experience for users 250 and 270 generated based on one or more of the analyses of the virtual environments, ascertained contextual data, identified commonalities, and the like. Further, the merged environment supports API calls that users 250 and 270 to share, transfer, and/or cover transactions over various POS systems.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for merging augmented reality experiences into an augmented reality environment, the method comprising:

determining, by a computing device, a first augmented reality experience of a first user and a second augmented reality experience of a second user;

analyzing, by the computing device, a plurality of environmental contextual data associated with the first augmented reality experience and the second augmented reality experience by segmenting the first and second augmented reality experiences for at least one virtual object associated with the plurality of environmental contextual data;

based on the analysis, generating, by the computing device, a merged augmented reality environment comprising the first user and the second user and a shared virtual object synchronized to the first and second augmented reality experiences;

analyzing, by the computing device, the merged augmented reality environment;

generating, by the computing device, a plurality of augmented reality interactions of the first and the second user based on the analysis; and synchronizing, by the computing device, the first augmented reality experience and the second augmented reality experience in the merged augmented reality environment by mirroring a first subset of a plurality of augmented reality interactions for presentation in the merged augmented reality environment via a second subset of the plurality of augmented reality interactions.

2. The computer-implemented method of claim 1, wherein analyzing the plurality of environmental contextual data comprises:

extracting, by the computing device, a plurality of multi-media data from the first augmented reality experience and the second augmented reality experience;

segmenting, by the computing device, the plurality of multi-media data for multi-dimensional virtual objects; and reconstructing, by the computing device, a 3D point cloud of the plurality of multi-media data based on the segmentation.

3. The computer-implemented method of claim 1, wherein analyzing the plurality of environmental contextual data further comprises:

identifying, by the computing device, a plurality of commonalities associated with the first augmented reality experience and the second augmented reality experience based on grouping data points derived from one or more clustering algorithms;

merging, by the computing device, the plurality of commonalities utilizing at least one machine learning algorithm.

4. The computer-implemented method of claim 1, wherein mirroring comprises:

overlaying virtual content based on the plurality of contextual information;

wherein the virtual content facilitates a plurality of smart transactions for the merged augmented reality environment.

5. The computer-implemented method of claim 4, where generating the plurality of augmented reality interactions comprises:

utilizing, by the computing device, a series of application programming interface (API) calls of the first user and the second user while interacting with the merged augmented reality environment.

6. The computer-implemented method of claim 4, wherein the second subset of the plurality of augmented reality interactions comprises a virtual object of the first augmented reality experience and the second augmented reality experience configured to support interactions with the first user and the second user.

7. The computer-implemented method of claim 6, wherein the virtual object is associated with a point of sale (POS) system integrated into the merged augmented reality environment.

8. A computer program product for merging augmented reality experiences into an augmented reality environment, the computer program product comprising one or more computer readable storage media and program instructions collectively stored on the one or more computer readable storage media, the stored program instructions comprising:

program instructions to determine a first augmented reality experience of a first user and a second augmented reality experience of a second user;

program instructions to analyze a plurality of environmental contextual data associated with the first augmented reality experience and the second augmented reality experience by segmenting the first and second augmented reality experiences for at least one virtual object associated with the plurality of environmental contextual data;

program instructions to generate a merged augmented reality environment comprising the first user and the second user based on the analysis and a shared virtual object synchronized to the first and second augmented reality experiences;

program instructions to analyze the merged augmented reality environment;

program instructions to generate a plurality of augmented reality interactions of the first and the second user based on the analysis; and program instructions to synchronize the first augmented reality experience and the second augmented reality experience in the merged augmented reality environment by mirroring a first subset of a plurality of augmented reality interactions for presentation in the merged augmented reality environment via a second subset of the plurality of augmented reality interactions.

9. The computer program product of claim 8, wherein program instructions to analyze the plurality of environmental contextual data further comprise:

program instructions to extract a plurality of multi-media data from the first and second augmented reality experiences;

program instructions to segment the plurality of multi-media data for multi-dimensional virtual objects; and program instructions to reconstruct a 3D point cloud of the plurality of multi-media data based on the segmentation.

10. The computer program product of claim 8, wherein program instructions to analyze the plurality of environmental contextual data further comprise:

program instructions to identify a plurality of commonalities associated with the first augmented reality experience and the second augmented reality experience based on grouping data points derived from one or more clustering algorithms;

program instructions to merge the plurality of commonalities utilizing at least one machine learning algorithm.

11. The computer program product of claim 8, wherein program instructions to mirror comprise:

program instructions to overlay virtual content based on the plurality of contextual information;

wherein the virtual content facilitates a plurality of smart transactions for the merged augmented reality environment.

12. The computer program product of claim 11, wherein the second subset of the plurality of augmented reality interactions comprises a virtual object of the first augmented reality experience and the second augmented reality experience configured to support interactions with the first user and the second user.

13. The computer program product of claim 12, wherein the virtual object is associated with a point of sale (POS) system integrated into the merged augmented reality environment.

14. A computer system for merging augmented reality experiences into an augmented reality environment, the computer system comprising:

one or more processors;

one or more computer-readable memories;

program instructions stored on at least one of the one or more computer-readable memories for execution by at least one of the one or more processors, the program instructions comprising:

program instructions to determine a first augmented reality experience of a first user and a second augmented reality experience of a second user;

program instructions to analyze a plurality of environmental contextual data associated with the first augmented reality experience and the second augmented reality experience by segmenting the first and second augmented reality experiences for at least one virtual object associated with the plurality of environmental contextual data;

program instructions to generate a merged augmented reality environment comprising the first user and the second user based on the analysis and a shared virtual object synchronized to the first and second augmented reality experiences; program instructions to analyze the merged augmented reality environment;

program instructions to generate a plurality of augmented reality interactions of the first and the second user based on the analysis; and program instructions to synchronize the first augmented reality experience and the second augmented reality experience in the merged augmented reality environment by mirroring a first subset of a plurality of augmented reality interactions for presentation in the merged augmented reality environment via a second subset of the plurality of augmented reality interactions.

15. The computer system of claim 14, wherein program instructions to analyze the plurality of environmental contextual data further comprise:

program instructions to extract a plurality of multi-media data from the first and second augmented reality experiences;

program instructions to segment the plurality of multi-media data for multi-dimensional virtual objects; and program instructions to reconstruct a 3D point cloud of the plurality of multi-media data based on the segmentation.

16. The computer system of claim 15, wherein program instructions to analyze the plurality of environmental contextual data further comprise:

program instructions to identify a plurality of commonalities associated with the first augmented reality experience and the second augmented reality experience based on grouping data points derived from one or more clustering algorithms;

program instructions to merge the plurality of commonalities utilizing at least one machine learning algorithm.

17. The computer system of claim 15, wherein program instructions to mirror comprise:

program instructions to overlay virtual content based on the plurality of contextual information;

wherein the virtual content facilitates a plurality of smart transactions for the merged augmented reality environment.

18. The computer system of claim 17, wherein program instructions to generate the plurality of augmented reality interactions comprise:

program instructions to utilize a series of application programming interface (API) calls of the first user and the second user while interacting with the merged augmented reality environment.

19. The computer system of claim 17, wherein the second subset of the plurality of augmented reality interactions comprises a virtual object of the first augmented reality experience and the second augmented reality experience configured to support interactions with the first user and the second user.

20. The computer system of claim 19, wherein the virtual object is associated with a point of sale (POS) system integrated into the merged augmented reality environment.

* * * * *